US006222858B1

(12) United States Patent
Counterman (10) Patent No.: US 6,222,858 B1
(45) Date of Patent: Apr. 24, 2001

(54) METHOD OF INVERSE MULTIPLEXING FOR ATM

(75) Inventor: Raymond C. Counterman, Canton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/247,832

(22) Filed: Feb. 10, 1999

(51) Int. Cl.$^7$ .................................................. H04J 3/24
(52) U.S. Cl. ........................... 370/474; 370/395; 370/469
(58) Field of Search .................................. 370/397, 399, 370/342, 391, 395, 469, 473, 474

(56) References Cited

U.S. PATENT DOCUMENTS

| 3,937,889 | | 2/1976 | Bell, III et al. ........................... 179/2 |
| 5,150,365 | | 9/1992 | Hirata et al. ........................... 370/123 |
| 5,528,630 | | 6/1996 | Ashley et al. ........................... 375/258 |
| 5,608,733 | | 3/1997 | Valée et al. ............................ 370/394 |
| 5,617,417 | | 4/1997 | Sathe et al. ............................ 370/394 |
| 5,627,501 | | 5/1997 | Biran et al. ........................... 333/17.1 |
| 5,727,051 | * | 3/1998 | Holender .............................. 379/112 |
| 5,875,192 | * | 2/1999 | Cam et al. ............................. 370/474 |
| 6,002,670 | * | 12/1999 | Rahman et al. ....................... 370/238 |
| 6,134,246 | * | 10/2000 | Cai et al. .............................. 370/474 |

OTHER PUBLICATIONS

American National Standards Institute (ANSI) Specification T1E1.4, "Very high–speed Digital Subscriber Lines", Feb. 11, 1998.

ATM Tutorial, dated Jun. 18, 1996.

"Asychronous Transfer Mode (ATM) Technology—An ATM Primer", printed Jan. 14, 1999.

Zahir Ebrahim, "A Brief Tutorial on ATM", dated Mar. 5, 1992.

American National Standards Institute (ANSI), "Network and Customer Installation Interfaces–Asymmetric Digital Subscriber Line (ADSL) Metallic Interface", (1995).

The ATM Forum Technical Committee, "Inverse Multiplexing for ATM (IMA) Specification Version 1.0", Jul. 1997.

* cited by examiner

*Primary Examiner*—Chau Nguyen
*Assistant Examiner*—D. Trinh
(74) *Attorney, Agent, or Firm*—Leonard Charles Suchyta (57) ABSTRACT

A method for flexible inverse multiplexing for ATM and for link grouping of communication links with different transmission rates and delay. The method of the present invention supports links which use a portion of the link bandwidth for one QoS objective (e.g., low delay) and another portion for another QoS objective (e.g., low cell loss). The method involves servicing each of a number of multiplexed flows with a predetermined number of cells. Cells are assigned to each flow during a number of cycles which make up an ATM frame. The number of cells assigned to each flow during each cycle is dynamically adjusted based upon the requirements of each flow, and may be different for each flow. The number of cells assigned to each flow during each cycle may either be fixed, or may vary from cycle to cycle.

38 Claims, 9 Drawing Sheets

METHOD OF INVERSE MULTIPLEXING FOR ATM

BACKGROUND OF THE INVENTION

1. Field of the Invention

The present invention relates to data transmission systems for transmitting various types of data, such as voice, video, and computer data. More particularly, the invention relates to inverse multiplexing for Asynchronous Transfer Mode ("ATM") over communication links with different transmission rates and/or delays.

2. Description of the Related Art

Asynchronous Transfer Mode (ATM) is a high-speed connection oriented switching and multiplexing communication scheme that allows for high speed telecommunications. ATM is essentially a packet switched communication scheme which utilizes fixed length packets or cells. ATM utilizes fixed size cells that are 53 octets long, with 5 bytes being header information and 48 bytes being payload information. The 48 byte cell payload may contain up to four bytes of information for the ATM adaptation layer, leaving at least 44 bytes for user data.

The term "asynchronous transfer mode" (ATM) was coined to contrast with "synchronous transfer mode" (STM). ATM is based on a time slotted transmission scheme in which data from different applications are multiplexed in accordance with their particular bandwidth, delay, and loss requirements. In ATM each time slot carries exactly one ATM cell. STM is also time slotted, however, in contrast to ATM, time is divided into a fixed number of slots which are grouped together to form a frame which repeats in time. All the time slots that are located at the same relative position in each frame can be grouped to form a circuit consisting of a fixed number of time slots and a fixed bandwidth. STM is inefficient in that the bandwidth associated with each circuit is dedicated full-time to each particular user, regardless of whether the user has data which needs to be transmitted.

ATM addresses many of the deficiencies found in STM communication. ATM networks enable a wide variety of communication devices to share common carrier communication links on a demand driven, as needed basis. The carriers used in ATM typically include relatively slow speed metallic wire links, such as the T1 carrier in North America (1.544 Mbps) or the E1 carrier in Europe (2.048 Mbps). The carriers used for ATM may also include higher speed optical links, such as SDH/SONET OC-3 (155.52 Mbps) and OC-12 (622.08 Mbps). ATM networks utilize statistical multiplexing to provide bandwidth on an as needed basis to individual users. This obviates the need for each user to have a dedicated, wideband communication channel for occasional communication. Instead, wideband communication is a shared resource which may be allocated on demand. Of course, if a number of users require wideband communication all at the same time, the capacity of the network may be momentarily exceeded, resulting in lower performance. To protect a link from overload, the ATM network and the user agree on a description of the user's traffic ("traffic contract") which the network uses to manage and allocate network resources (i.e., link bandwidth and buffer occupancy), as well as to monitor the user's traffic for compliance with the agreement.

The ATM header information identifies the Virtual Path (Virtual Path Identifier or VPI), Virtual Channel (Virtual Channel Identifier or VCI), payload type, and cell loss priority. The VPI and VCI together from a Virtual Circuit. The ATM header also provides flow control and header error control. All the cells of a Virtual Circuit (VPI/VCI) follow the same path through the network, which is determined during call set-up procedures or by assignment. The different users of the ATM network provide their cells to the ATM network interface where they are queued for cell assignment and transmission. Cell transmission in an ATM network is causal, i.e., the cells in a connection (cells with the same VPI/VCI) arrive in order at the destination or far end. This is because the cells travel over the same Virtual Circuit.

An ATM network can support different types of services, such as loss sensitive/delay sensitive, loss insensitive/delay sensitive, loss sensitive/delay insensitive and loss insensitive/delay insensitive. The required QoS (Quality of Service) is determined during call set-up.

T1 carriers are typically a cost effective way of user access to an ATM network, as well as connection between ATM network switches. However, with the proliferation of increased data transfer and transmission requirements, the need for transmission bandwidth greater than that of a T1 carrier is needed in many situations. T3 carriers may be used in such situations; however, the use of T3 carriers is disadvantageous in that their cost is still somewhat prohibitive. Also, the use of T3 carriers as dedicated communication links is inefficient in that oftentimes they are under-utilized in relation to their data transmission capabilities.

ATM inverse multiplexers (IMA) have been proposed which combine several communication lines, e.g., T1 carriers, into a higher bandwidth aggregate communication path. See, for example, U.S. Pat. Nos. 5,608,733 and 5,617,417 and the ATM Forum, "Inverse Multiplexing for ATM (IMA) Specification", Version 1.0, July, 1997, the contents of which are incorporated herein by reference. ATM inverse multiplexing provides a modular bandwidth for user access to ATM networks and for connection between ATM network elements at rates between the traditional communication rates, for example, between the T1/E1 and T3/E3 rates. T3/E3 links may not be generally available throughout a network, and thus, ATM inverse multiplexing provides an effective method combining several T1/E1 links to collectively provide higher intermediate rates.

Figure 1:
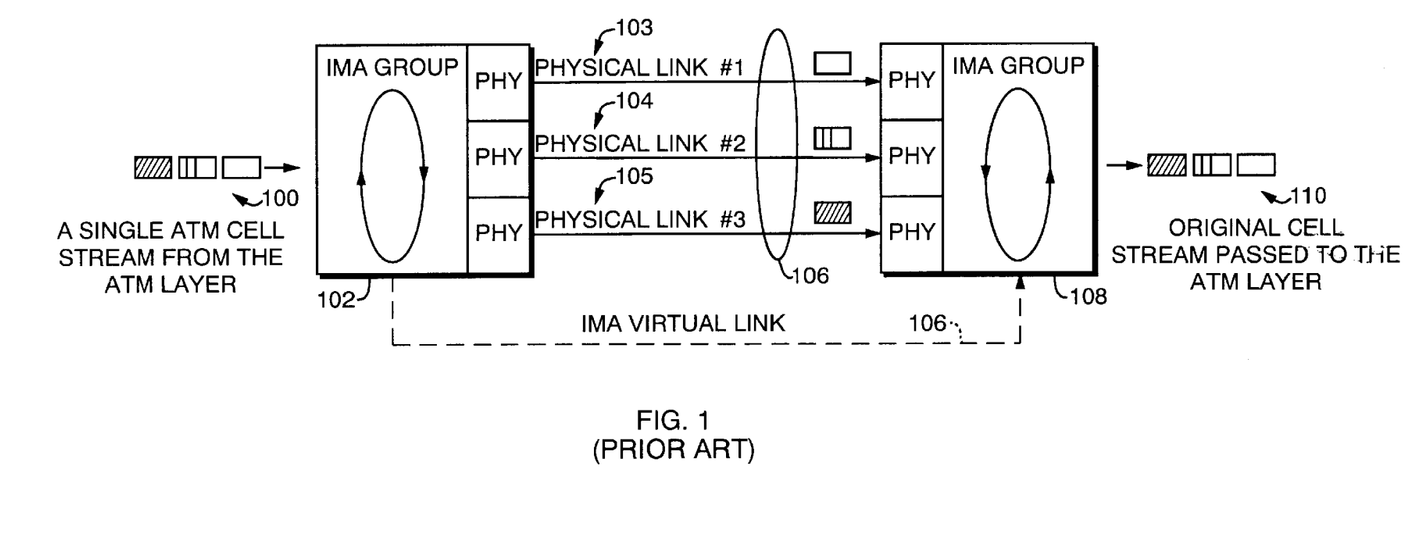
FIG. 1 is a block diagram of inverse multiplexing for ATM used to establish a virtual link.

The general concept of ATM inverse multiplexing is shown in FIG. 1. In the transmit direction, an ATM cell stream 100 is received from the ATM layer and distributed on a cell by cell basis by the ATM inverse multiplexer 102 to a number of physical links 103, 104, and 105 which collectively make up Virtual Link 106. At the far end, a receiving ATM inverse multiplexer recombines the cells from each link, on a cell by cell basis, recreating the original ATM cell stream 110 which is then passed onto the ATM layer.

The transmit ATM inverse multiplexer periodically transmits special cells that contain information which permits reconstruction of the ATM cell stream at the receiving end. These cells, referred to as IMA Control Protocol (ICP) cells, also define an IMA frame. The transmitter aligns the transmission of IMA frames on all links to allow the receiver to adjust for differential link delays among the individual physical links. In this manner, the receiver can detect and adjust for differential delays by measuring the arrival times of the IMA frames on each link.

At the transmitting end, cells are transmitted continuously. If there are no ATM layer cells to be transmitted within a given IMA frame, then the ATM inverse multiplexer transmits Filler Cells to maintain a continuous stream of cells at the physical layer. The Filler Cells are discarded at the receiving end. A new physical layer OAM (operation administration and maintenance) cell is defined for use in ATM inverse multiplexing and includes codes which indicate whether a cell is an ICP or Filler Cell. The individual cell sequence for IMA framing for the case of three physical links is shown in FIG. 2.

Figure 2:
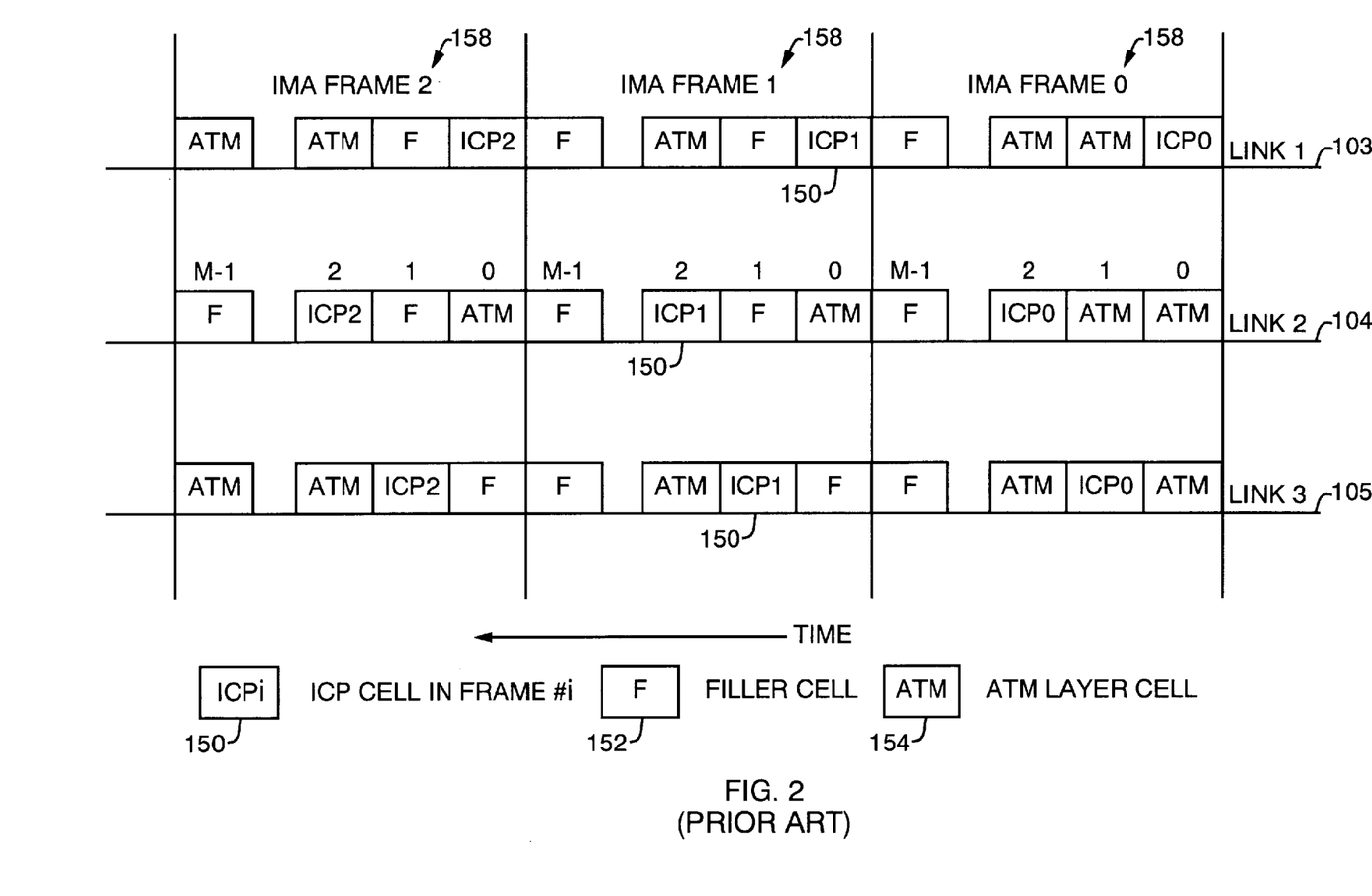
FIG. 2 is a timeline illustration of IMA frames.

As shown in FIG. 2, the transmitter creates an IMA frame 158 on physical links 103, 104, and 105 by periodically transmitting an ICP cell 150 on each link. Although the ICP cell defines an IMA frame, the ICP cell 150 may be located anywhere within the IMA frame 158. The position of the ICP cell 150 relative to the beginning of the frame (frame boundary) is referred to as the ICP cell offset. The use of ICP cell offsets is used to reduce cell delay variation (CDV) caused by the insertion of the frame marker, i.e., the ICP cell 150 itself. The ICP cell offset is conveyed as protocol information in each link's ICP cell. For the IMA framing shown in FIG. 2, link 103 has an ICP cell offset value of 0, link 104 has an ICP cell offset value of 2, and link 105 has an ICP cell offset value of 1. Filler cells 152 are sent at the transmitting end if there are no ATM layer cells 154 to be transmitted in available transmit opportunities between ICP cells 150. Each IMA frame is defined as M consecutive cells, numbered 0 to (M−1) for each link. ATM Inverse Multiplexing Over xDSL Lines The term xDSL is used to refer to various digital subscriber line technologies, such as DSL, HDSL, HDSL2, ADSL and VDSL and others, which typically involve the transmission of data in the portion of the frequency spectrum above standard telephone service. xDSL lines may be used as the physical links for data transmission in an ATM network. In such an arrangement, cells from the ATM layer are delivered to the physical layer and transmitted over the xDSL link (e.g., metallic wire pair). At the far end, the cells from the physical layer are delivered to the ATM layer.

Multiple applications may share the xDSL bandwidth, and each of these applications may require a different Quality of Service (QoS). Because of the operational noise inherent in xDSL environments, forward error correction (FEC) is typically used to reduce the effects of noise and to meet the required QoS objectives. Convolutional interleaving may also be used to provide low cell loss in the presence of impulse noise, however, it often introduces delay. Therefore, in order to meet the desired performance requirements, a dual (or more complex) FEC approach is often used. The dual FEC approach provides a low delay path with greater cell loss probability and a high delay path with less cell loss probability.

The existing telephone network infrastructure has limited capability for meeting required transmission rates over desired distances, while at the same time meeting QoS objectives. This is because the information carrying capacity (bit rate) of a line in the existing telephone network is limited due to several factors, including, (1) the type of cables and topology of the network (e.g., the use of bridged taps), (2) the condition of the physical plant, and (3) the noise picked up by the network (noise ingress). Also, a reduction in capacity may result from restricted use of particular frequency bands (e.g., amateur radio bands) because of potential radio frequency interference. These factors reduce either the usable bandwidth (bit rate) or the usable distance of the working line (reach).

For a given xDSL network architecture, a customer's line may not support the bandwidth required. One alternative for increasing the line capacity is to condition the line. Another alternative is to reduce the usable distance of the line, for example by providing service only to those customers within a certain distance (i.e., the usable distance) or by placing loop carriers out in the field at certain intervals (i.e, the usable distance). These alternatives, however, have obvious disadvantages. ATM inverse multiplexing may be used in such cases to increase the capacity of the customer's line and to avoid the undesirable consequences of the alternative approaches outlined above.

Conventional ATM Inverse Multiplexing

Conventional ATM inverse multiplexers are limited in that they may only be used to multiplex same-speed carriers into higher bandwidth, aggregate communication paths. All of the individual links which are multiplexed into the aggregate link must operate at the same speed. Also, cells from the ATM layer are transmitted on the individual physical links in a cyclic round-robin fashion.

The disadvantages of conventional ATM inverse multiplexers become quite apparent given the fact that dissimilar cell rates are quite common in many communication systems, such as xDSL. There are a finite number of lines available between any network access node (e.g., XDSL equipment located in a central office, or other main facility, or in remote cabinets such as digital line cards) and the individual customer premises. The condition of each line and the noise of each channel will vary from line to line. Given a reasonable bit rate granularity and operating noise margin, any two lines may operate at different optimal rates. According to conventional ATM inverse multiplexers, higher speed lines would be compromised by reducing their speed to the "lowest common denominator", i.e., the speed achievable by the slowest line in a group of lines being multiplexed. This limits the practical utility of inverse multiplexing by decreasing the combined bandwidth of the group of lines.

During operation, or as a function of time, temperature, or other conditions, the performance of a line in a group may change, resulting in dissimilar cell rates. Conventional ATM inverse multiplexing is not equipped to deal with such a situation, and will, presumably remove the changed line. This again leads to a decrease in the available bandwidth.

One of the likely reasons for different cell rates among lines is the difference in the allocation of a link bandwidth to FEC cell flows. For example, an ADSL line may have 20% allocated as a low delay path for delay sensitive applications, and 80% allocated as a low cell loss path for loss sensitive applications such as video. To increase the capacity for video, a second ADSL link is multiplexed at 100% low cell loss. Even though the bit rate or throughput provided by the line code (e.g., DMT, QAM) of the two ADSL lines is provisioned to be the same, the cell flows through the different FEC paths result in dissimilar cell rates. Again, because of the dissimilar cell rates, these lines may not be ATM inverse multiplexed using conventional techniques.

Using the case of two ADSL lines as an example, both ADSL lines may have the same cell rate and the same cell transfer delay for similarly allocated link bandwidths. Both ADSL lines may have 20% allocated as a low delay path and 80% allocated as a low cell loss path. Conventional ATM inverse multiplexing techniques are not capable of multiplexing links that have cell flows with different cell transmission delays. Conventional techniques can only operate with a physical link that is characterized by a single transmission delay, such as, for example, a T1 carrier that provides ATM cells in a 193 bit frame (192 bits plus one framing bit) every 125 milliseconds. In accordance with such conventional multiplexing techniques, additional delay is added to some links in order to make the cell delay uniform for all links. This approach, however, eliminates the desired objective of having a low delay QoS because its delay would be made equal to the low loss QoS path, which by the nature of FEC has much greater delay.

Certain conventional multiplexing techniques do compensate for delay, however, the compensation is for differences in transmission delay among links.

Accordingly, it will be apparent to those skilled in the art that there continues to be a need for a method of ATM inverse multiplexing of links of different line rates, links having different cell rates but with similar cell transfer delay, and links that provide two or more cell flows that meet specific quality of service (QoS) objectives (e.g., cell loss and/or cell delay). The term "flow" is used to refer to the flow of cells over a service access point of the Transmission Convergence (TC) sublayer associated with a physical interface (or link). The present invention addresses these needs and others.

SUMMARY OF THE INVENTION

Briefly, and in general terms, the present invention provides a method for flexible inverse multiplexing for ATM and for link grouping of communication links with different transmission rates and delay. The method of the present invention supports links which use a portion of the link bandwidth for one QoS objective (e.g., low delay) and another portion for another QoS objective (e.g., low cell loss). The method involves servicing each of a number of multiplexed flows with a predetermined number of cells. Cells are assigned to each flow during a number of cycles which make up an IMA frame. The number of cells assigned to each flow during each cycle is dynamically adjusted based upon the requirements of each flow, and may be different for each flow. The number of cells assigned to each flow during each cycle may either be fixed, or may vary from cycle to cycle.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENT

In the following detailed description, like reference numerals will be used to refer to like or corresponding elements in the different figures of the drawings.

The IMA sublayer is part of the ATM physical layer, and is located between the traditional Transmission Convergence (TC) sublayer and the ATM layer. The IMA sublayer is based on the B-ISDN protocol reference model defined in ITU-T, Recommendation I.321, "B-ISDN Protocol Reference Model and its Applications", March, 1993, the contents of which are incorporated herein by reference.

Figure 3:
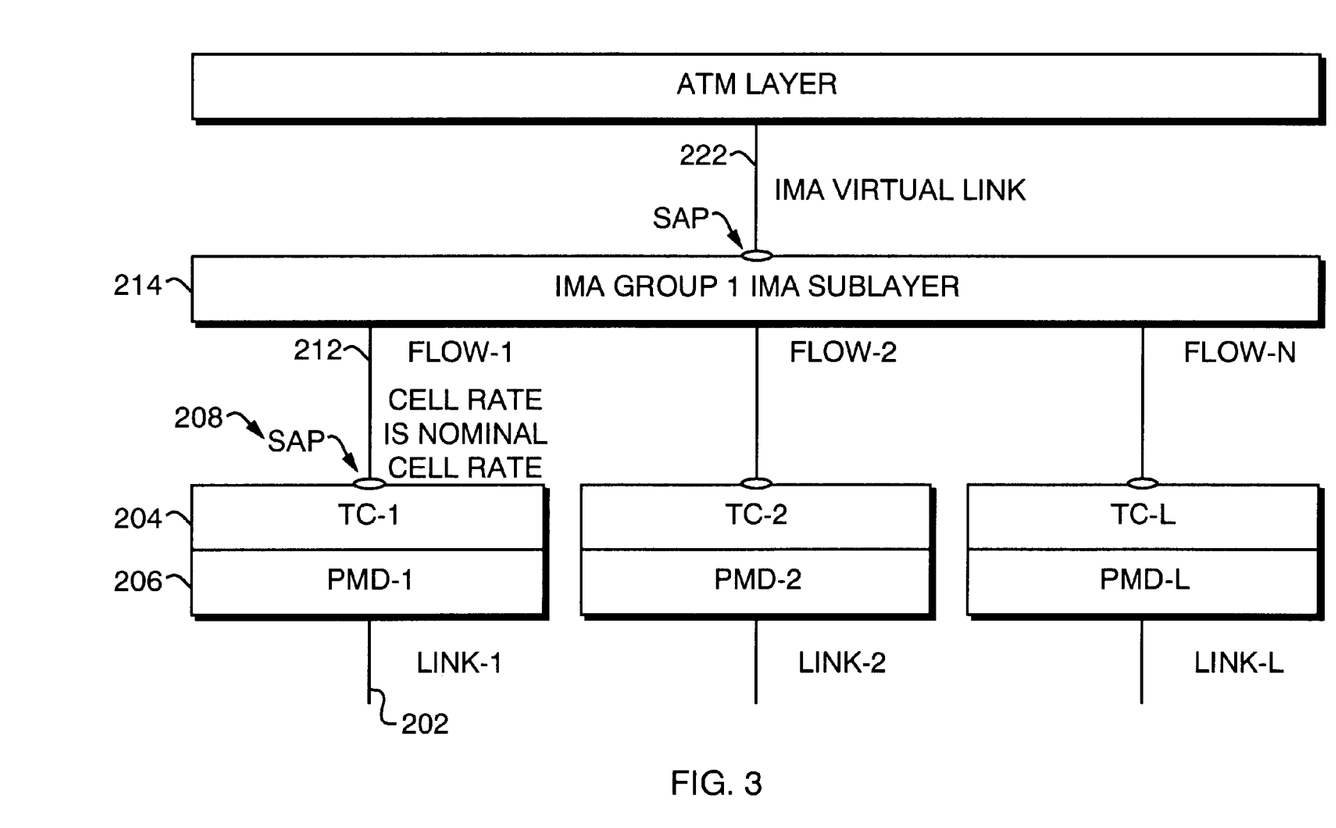
FIG. 3 is a block diagram of ATM inverse multiplexing of multiple links and flows.

A simplified protocol reference model is shown in FIG. 3 and includes a number of links 202 which nominally have the same cell transfer delay (CTD) but different nominal cell rates (NCRs). The nominal cell transfer delay is typically the result of selecting certain FEC parameters in order to meet a desired, common QoS objective. In the model of FIG. 3, flows 212 (flow-1, flow-2, ... flow-n) collectively make up a single IMA virtual link 222. Each flow 212 corresponds to a link 202. Each physical link 202 includes a Transmission Convergence sublayer 204 and a Physical Medium Dependent sublayer 206. A Service Access Point (SAP) 208 provides the interface between the TC sublayer 204 of a specific link and the IMA sublayer 214. All the flows 212 between the IMA sublayer 214 and the TC layers 204 have the same nominal cell transfer delay. There is a single common QoS for each link 202 and therefore, the aggregate IMA virtual link 222 has the same QoS. Because of the single QoS for each link 202, only one flow is needed over a Transmission Convergence SAP.

Figure 4:
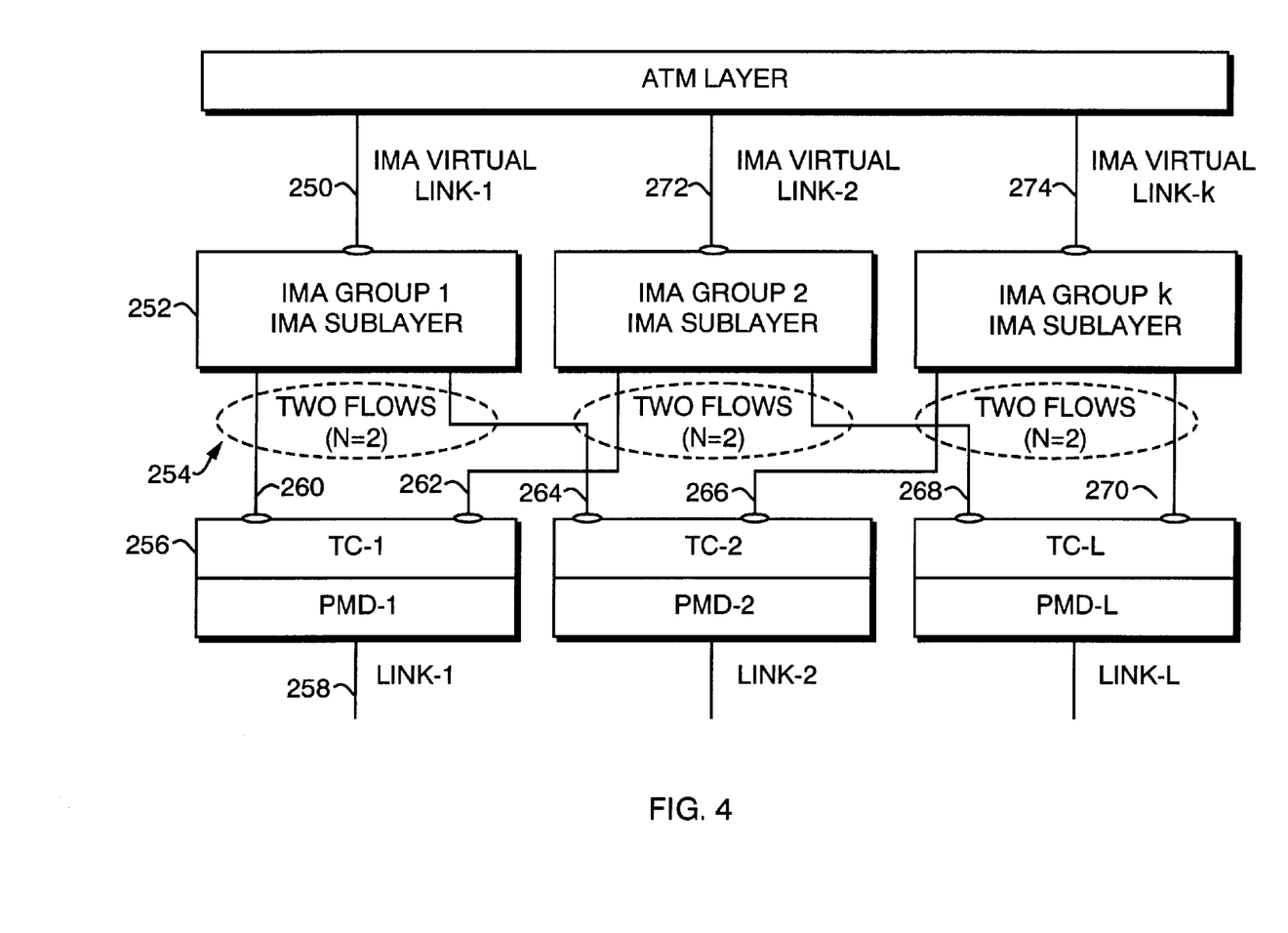
FIG. 4 is a block diagram of flexible ATM inverse multiplexing.

A more complete model for flexible ATM inverse multiplexing according to the present invention is shown in FIG. 4. In the model of FIG. 4, k IMA virtual links 250, 272, and 274 each correspond to an IMA group or sublayer 252. Each IMA virtual link 250 is the sum of the flows 254 for the respective IMA group 252. The flows 254 are between each IMA sublayer 252 and one or more TC sublayers 256 from several links 258. The flows 254 in an IMA group may have different nominal cell rates, but have the same nominal cell transfer delay, in order for the corresponding IMA virtual link 250 to meet the desired QoS objective. A link 258 carries one or more flows over a physical path between inverse multiplexers. An IMA link transmitter provides one or more flows from an IMA sublayer to the physical layer. The physical layer functions are grouped into the TC layer and the Physical Media Dependent (PMD) sublayer. Each IMA sublayer flow matches the ATM transfer characteristic (e.g., cell delay and rate) provided by the physical layers at each end of a link. A link's physical layer will process received ATM cells to provide one or more flows from the physical layer to the IMA sublayer.

A specific example of flexible IMA according to the model of FIG. 4 is shown in Table 1 below:

TABLE 1

| IMA Group | Rate (kcell/s) | Latency (ms) |
|---|---|---|
| TC-1, IMA Group 1, Flow 1 (260) | 1 | 0.5 |
| TC-1, IMA Group 2, Flow 1 (262) | 5 | 4.0 |
| TC-2, IMA Group 1, Flow 2 (264) | 2 | 0.5 |
| TC-2, IMA Group 3, Flow 1 (266) | 4 | 10.0 |
| TC-3, IMA Group 2, Flow 2 (268) | 2 | 4.0 |
| TC-3, IMA Group 3, Flow 2 (270) | 8 | 10.0 |
| IMA Virtual Link 1 (250) | 3 | 0.5 |
| IMA Virtual Link 2 (272) | 7 | 4.0 |
| IMA Virtual Link 3 (274) | 12 | 10.0 |

According to Table 1, IMA virtual link 1 (250) includes flows 260 and 264, which have cell rates (kcell/s) of 1 and 2, respectively, and delays (latency in ms) of 0.5 and 0.5, respectively. Thus, IMA virtual link 1 (250) will have a total cell rate of 3, which is the sum of the individual cell rates of flows 260 and 264. Also, IMA virtual link 1 (250) will have a latency of 0.5 ms, which is the common latency of its constituent flows. As shown in Table 1, IMA virtual links 2 and 3 (272 and 274) will be similarly characterized based on their individual constituent flows.

As shown in Table 1 and FIG. 4, the present invention groups cell flows which have the same latency (or delay) into a virtual link although they may have different cell rates, and then transmits using each cell flow at its respective rate. This is in contrast to conventional techniques which increase the delay of flows in a group to match the highest delay flow in the group.

The inverse multiplexing function controls the distribution of cells onto the links or flows for each of the sublayers; handles different delays within a bounded QoS; handles multiplexing of different cell rates; and handles actions to be taken when links/flows are dropped/added or when they are failed/restored, all in accordance with the ATM Forum Specification. The IMA process of splitting and recombining flows is transparent to the ATM layer above.

The Nominal Cell Rate (NCR) is the cell rate available for carrying cells between an IMA sublayer and the Transmission Convergence sublayer of a specific physical layer. A Reference Cell Rate (Rref) is used to provide common timing to flows at the transmit end and to recombine the flows at the receive end. The Reference Cell Rate is related to the Nominal Cell Rate according to the following relationship:

$$NCR(i) = k(i) \times Rref \quad (1)$$

where k(i) is a positive integer for i=1, 2, ... N flows.

In an IMA frame of period T, M(i) is the number of cells in IMA Frame i having a Nominal Cell Rate NCR(i). The IMA frame period T (in seconds) is related to the number of cells and the Nominal Cell Rate of each flow, for up to N flows of index i of an IMA group, according to the following relationship:

$$T = M(1)/NCR(1) = M(2)/NCR(2) = M(i)/NCR(i) \text{ for } i=1, 2, \ldots N \quad (2)$$

In order to properly align cells to a frame boundary, the product of the frame period T and Reference Cell Rate Rref must be a positive integer, and is as follows:

$$T \times Rref = M(1)/k(1) = M(2)/k(2) = M(i)/k(i) = a \quad (3)$$

where a, k(i) and M(i) are positive integers for i=1, 2, ... N.

Using Equations (2) and (3), the Reference Cell Rate Rref is therefore given by:

$$Rref = M(i)/[T \times k(i)] \text{(cells/second) for } i=1, 2, \ldots N \quad (4)$$

The frame period T, Reference Cell Rate Rref, and other parameters are typically known at start up.

ATM cells are passed between the IMA sublayer and the ATM layer over an IMA virtual link. The Nominal Cell Rate of the aggregate of N flows making up the virtual link between the IMA sublayer and the TC sublayer is the Virtual Link Cell Rate (VLCR). The Virtual Link Cell Rate is approximately the sum of the constituent N Nominal Cell Rates, and is, strictly speaking, less than the aggregate, as given by:

$$VLCR < \sum_{i=1}^{N} NCR(i) \quad (5)$$

A more precise expression for the Virtual Link Cell Rate may be determined from the definition of the relative cell rate given in the ATM Forum Specification, "Inverse Multiplexing for ATM (IMA) Specification", Version 1.0 July 1997 (ATM Forum Technical Committee). In the ATM Forum Specification, the Data Cell Rate is derived from a single flow of cells from each link, and each flow has the same nominal Link Cell Rate. For a T1 carrier, the nominal Link Cell Rate is 3622.6 cells per second. The Data Cell Rate approximates the number of links times 3622.6 cells per second. In contrast, flexible IMA in accordance with the present invention, multiplexes and de-multiplexes flows of different rates (Nominal Cell Rates). For each link, a flow may be equal to the physical payload capacity (e.g., T1 carrier of 3622.6 cells per second) or a portion of that capacity. While the physical link rates may be the same, the portions of link bandwidth may be dissimilar resulting in flows with different rates. Also, in contrast to the ATM Forum Specification, in the present invention, the number of cells, M, in each IMA frame may be different for each flow.

The Virtual Link Cell Rate is defined as the rate at which ATM cells are passed from the ATM layer to the IMA sublayer on transmit, and from the IMA sublayer to the ATM layer on receive, for a given IMA group. In the ATM Forum Specification, one of the physical links is used as a timing reference for multiplexing and de-multiplexing. In contrast, flexible IMA in accordance with the present invention multiplexes and de-multiplexes flows of different rates using a Reference Cell Rate, Rref. One of the links shall provide a cell flow from which Rref is derived and used as the timing reference for an IMA group. The rate of the reference cell flow is the Nominal Cell Rate of the flow and the value of Rref is related to the Nominal Cell Rate of the reference flow by Equation 2. The value of Rref and the reference link and flow are typically known at start up. At the transmit end, Rref is used to generate timing for the IMA group of N flows. At the receiving end, Rref is used to combine constituent flows of the IMA group. The IMA VLCR is derived at both the transmit and receive ends for N flows in an IMA group, according to the following relationship:

$$VLCR = \sum_{i=1}^{N} [k(i) \times Rref] \times J(i) \times [(M(i) - 1)/M(i)] \quad (6)$$

In Equation (6), the VLCR is the sum total of the cell rates of the individual flows, adjusted by certain factors. First, the term [k(i)×Rref] represents the cell rate of the ith flow. The term J(i) is a scale factor which accounts for the insertion of stuff events, and typically has a value of 2048/2049. Stuff events are a function of the IMA process and act to prevent transmit buffer underruns/overruns on the individual flows. The appropriate value for J(i) will depend on the timing differences between links and the link used to derive the Reference Cell Rate. M(i) is the IMA frame length in cell units for a particular flow, and the last factor, [(M(i)−1)/M(i)], accounts for an ICP cell being periodically inserted to define the frame boundary.

Figure 5:
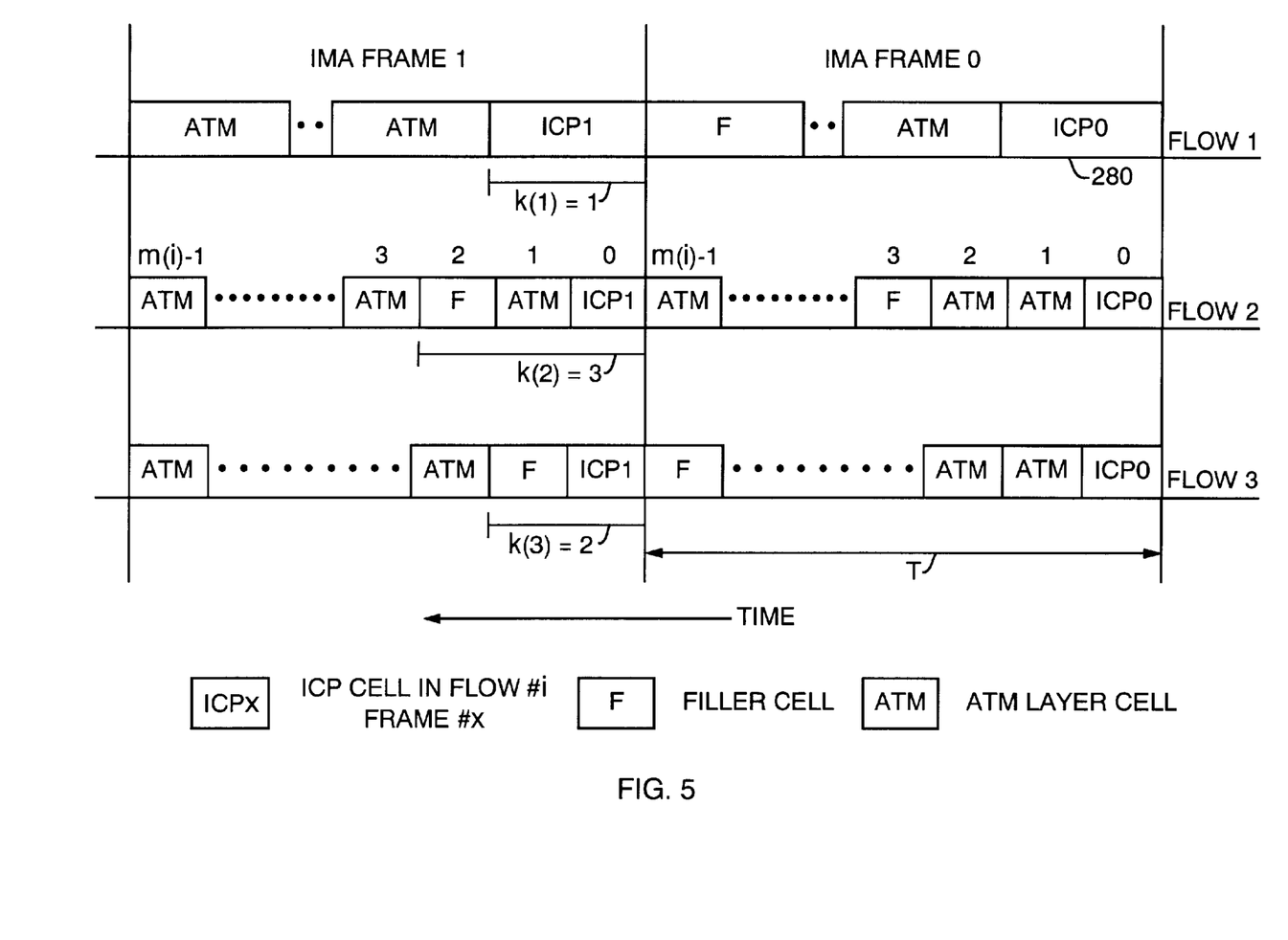
FIG. 5 is a timeline illustration of flexible IMA frames.

The flexible IMA frame is used as the unit of control in the IMA protocol, and is defined as M consecutive cells (numbered 0 to M−1 for each flow) across the N flows in an IMA group. This is illustrated in FIG. 5, for the case of three flows. The number of cells, M, in a frame may be different for each flow since the flows may have different cell rates. This is illustrated in FIG. 5 by the different sized cells for the flows. One of the M cells on each of the N flows (e.g., 280) is an ICP cell that occurs within the frame at the ICP cell offset position. The offset position may vary from link to link. In the example of FIG. 5, the ICP cells are shown at the start of a frame for ease of illustration and explanation; however, in practice, ICP cells should be distributed more evenly over the IMA frame. Having the ICP cells at the start of a frame is not desired in actual implementation because of the associated increase in Cell Delay Variation on the IMA group virtual link. This occurs because during the time interval at the beginning of the frame only ICP cells are sent. This delays the cells awaiting transmission until all links have transmitted an ICP cell. Distributing the ICP cells at different positions in the frames results in some Filler or ATM layer cells being transmitted over the links at any point in time. It should also be noted that within an IMA frame, the ICP cells on all flows have the same IMA frame sequence number (e.g., ICP0, ICP1, ... ).

The ICP offset method is in accordance with the ATM Forum Specification and results in a reduction of the Cell Delay Variation (CDV), otherwise caused by the insertion of the frame marker ICP cell. In contrast to the conventional IMA frame in the ATM Forum Specification in which all flows have the same number of cells in a frame, the frame structure according to the present invention allows flows with either similar or dissimilar cell numbers in a frame. Although the cell numbers for the different flows may be dissimilar, they are still an integer multiple of Rref.

The IMA frame length M(i) and the number of flows N are defined by a management entity during the IMA link start up procedure. The value of M used in the IMA approach is carried in the ICP cell as part of the "IMA Frame Length" field. The value of M is configurable and may be different for the individual flows in an IMA group. The ICP stuff mechanism, as defined in the ATM Forum Specification, is a controlled violation of the IMA consecutive frame definition. This violation is defined as a "stuff event", which is composed of an ICP frame marker cell followed by one or more ICP cells, the latter containing an indication that they are stuff cells.

The IMA ID is used to identify the IMA ID group as in the ATM Forum Specification. However, in flexible IMA, the IMA group is composed of flows rather than links.

In accordance with the flexible IMA approach of the present invention, an IMA frame is composed of M consecutive cells transmitted on each flow within the IMA group. The ICP cell is sent on each link once per IMA frame, and thus, is transmitted once every M cells. At the transmit end, the transmit IMA aligns the transmission of IMA frames on all links within an IMA group. The ICP cell may be located anywhere within the IMA frame, i.e., the offset value may be anywhere from 0 to M−1. An ICP cell offset of 0 indicates that the ICP cell is the first cell of the IMA frame on that particular flow. Similarly, an ICP cell offset of M−1 means that the ICP cell is the last cell of the IMA frame on that flow.

Flexible IMA for cell streams of dissimilar cell rates in accordance with the present invention is achieved using a new method of creating IMA frames. The simple round robin method of the ATM Forum Specification is not capable of such multiplexing. Instead, two alternative methods of IMA frame creation are utilized. The first is referred to as the "simple K" method and the second, more flexible approach, is referred to as the "variable q" method. As will be discussed in more detail below, the simple k method provides the process for servicing flows with integer rate relationships (Equation (3)) which results in each flow being serviced with the same number of cells, k(i), for each cycle of the round robin servicing. In contrast, according to the variable q approach, a different number of cells may be provided for each flow during sequential round robin cycles. Essentially, according to the simple k approach, each flow is provided with a fixed number of cells for each sequential servicing cycle, although the fixed number may be different from flow to flow. According to the variable q approach, the number of cells provided to each flow may vary from cycle to cycle, in addition to being different from flow to flow. The variable q method provides finer granularity in the rate relationship among flows in a flow group. The variable q method also requires less buffering for some flow rate relationships than the simple k method, thereby reducing the latency between IMA end points.

THE SIMPLE K METHOD

Figure 6:
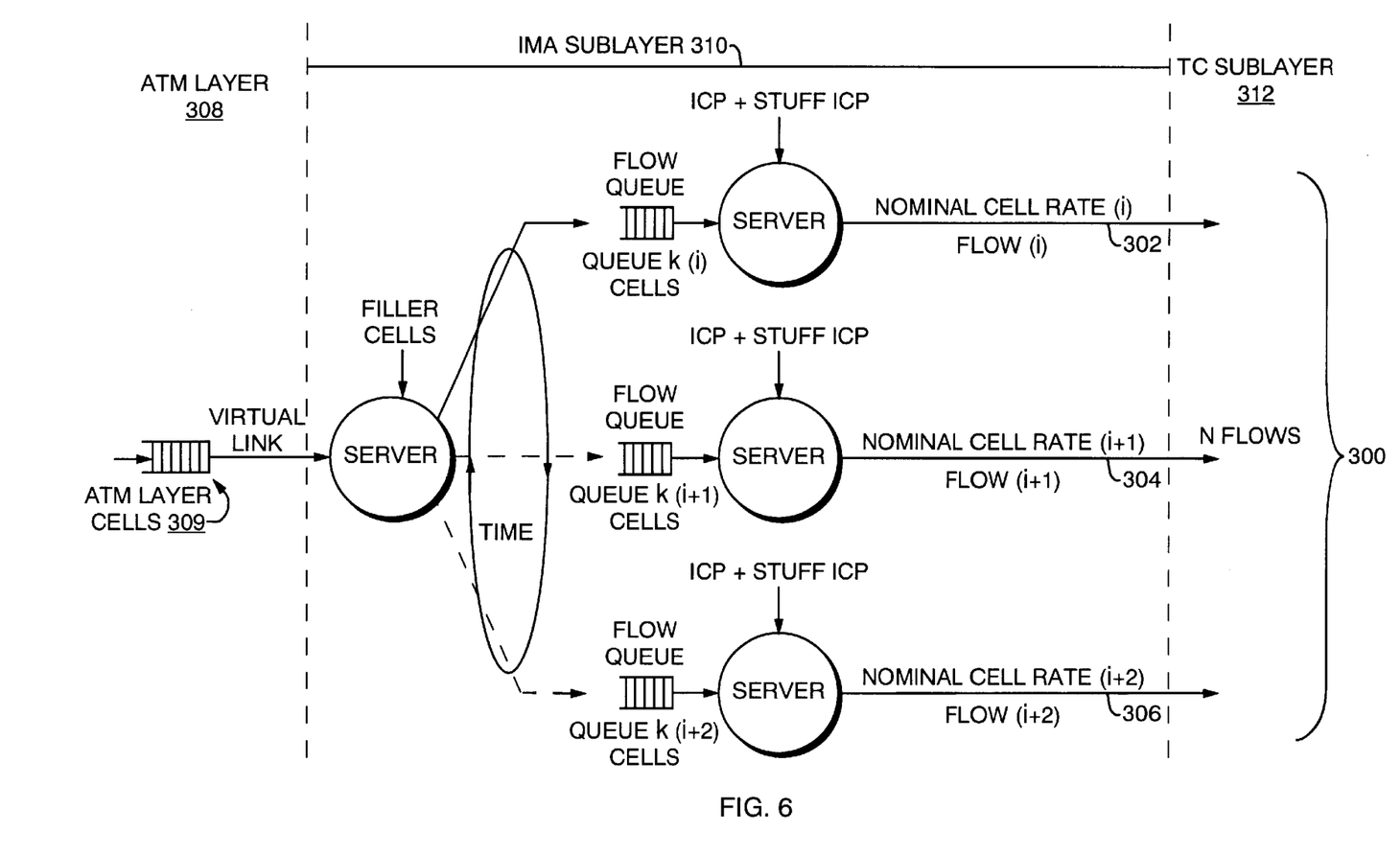
FIG. 6 is a block diagram of flexible ATM inverse multiplexing according to the "simple k" method of the present invention.

For each flow i in an IMA flow group there are M(i) cells in a frame and an integer k(i), such that the flows are related as follows:

$$M(1)/k(1)=M(2)/k(2)=M(i)/k(i) \text{(cells)} \quad (7)$$

where i=1, 2, ... N and N is the number of flows in an IMA group. The nominal cell rate of each flow is defined to adhere to the relationship set out in Equation (7). The unit of "k" cells forms the basis of the flexible inverse multiplexing scheme. The transmit process for the simple k method is illustrated in FIG. 6. The receiver essentially performs the reverse process.

As indicated above, an IMA group may have up to N flows. The flows pass from the IMA sublayer 310 to the TC sublayer 312 of one or more physical interfaces. In this manner, the IMA virtual link carries a cell stream from the ATM layer of one IMA over the multiplexed links to a receiving IMA. The particular IMA group 300 shown in FIG. 6 includes three flows 302, 304, and 306. Cells are received from an ATM layer 308 and passed to IMA sublayer 310 at the Virtual Link Cell Rate. The IMA sublayer 310 services the ATM layer queue 309 and assigns the cells to the different flows 302,304,306. Each of the flows is passed k(i) cells in a sequential order, such that flow 1 (302) is passed k(1) cells, then flow 2 (304) is passed k(2) cells, and flow 3 (306) is passed k(3) cells. For each cycle, the k(i) ATM layer cells for each flow are placed in a flow queue. If less than k(i) ATM layer cells are available when the IMA sublayer requests them, then filler cells are added to reach the total of k(i) cells. ATM layer cells are passed to the respective flows first, followed by filler cells, if any. The IMA frame is formed for each flow by inserting an ICP cell at the rate of 1/T (T being the frame period). If there are timing differences between the clocks on the links, the ICP cell may be repeatedly inserted to compensate for such timing differences. This latter process is referred to as an ICP stuff event.

There are several possible sequences for enqueuing the flows in an IMA group. For any particular sequence used, both the transmit and receive IMAs will need to have the same ordered list of flows in the IMA group. Each flow is assigned a Flow ID, e.g., the index "i" used to refer to the particular flows.

One variant of the "simple k" approach is to service the flow with the lowest cell rate first, followed by the flow with the next highest cell rate, and so on. Essentially, this results in servicing flows in the order of lowest to highest k value.

Figure 7:
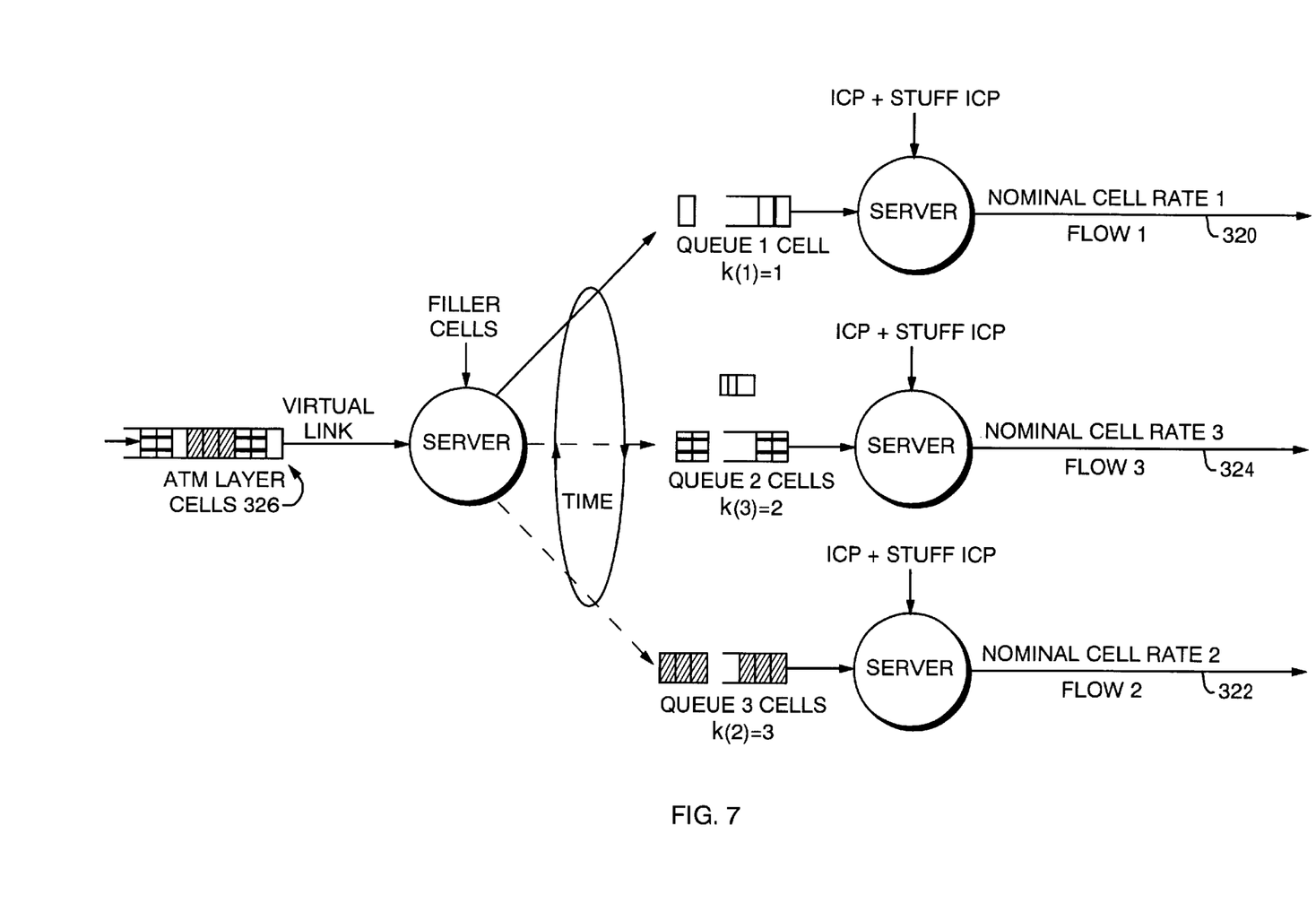
FIG. 7 is a block diagram of flexible ATM inverse multiplexing according to a first variant of the "simple k" method of the present invention.

This approach is illustrated in FIG. 7. The IMA group in FIG. 7 includes three flows, flow 1 (320), flow 2 (322), and flow 3 (324), which are configured such that the cell rate of flow 3 is twice the cell rate of flow 1 and the cell rate of flow 2 is three times the cell rate of flow 1. In servicing these flows, one ATM layer cell is passed from the ATM layer 326 to flow 1 (320), then two ATM layer cells are passed from the ATM layer 326 to flow 3 (324), and then three ATM layer cells are passed from the ATM layer 326 to flow 2 (322). The sequence then repeats with one ATM layer cell being passed from the ATM layer 326 to flow 1 (320) and so on.

Figure 8:
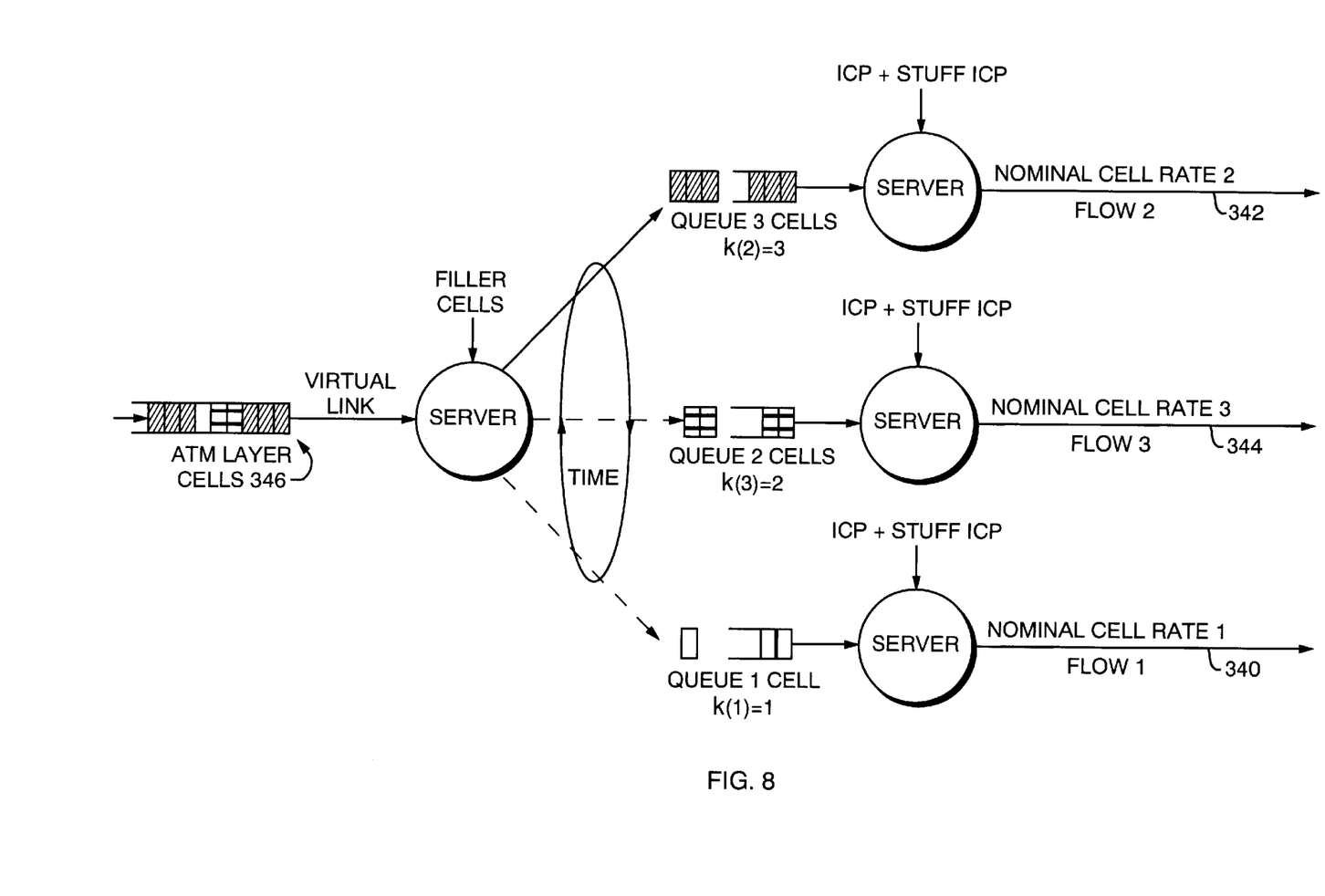
FIG. 8 is a block diagram of flexible ATM inverse multiplexing according to a second variant of the "simple k" method of the present invention.

Another variant of the "simple k" approach is to service the flow with the highest cell rate first, then the flow with the next lowest rate, and so on. Essentially, this results in servicing flows in the order of highest to lowest k value. This approach is illustrated in FIG. 8. The IMA group in FIG. 8 includes three flows, flow 1 (340), flow 2 (342), and flow 3 (344), which are configured the same as the flows in FIG. 7, i.e., the cell rate of flow 3 is twice the cell rate of flow 1 and the cell rate of flow 2 is three times the cell rate of flow 1. In servicing these flows, three ATM layer cells are passed from ATM layer 346 to flow 2 (342), two ATM layer cells are passed from ATM layer 346 to flow 3 (344), and one ATM layer cell is passed from ATM layer 346 to flow 1 (340). The sequence then repeats with three ATM layer cells being passed from ATM layer 346 to flow 2 (342), and so on.

VARIABLE Q METHOD

The simple k method described above is adequate for servicing flows which have dissimilar cell rates, which are nevertheless, integer multiples of each other. If the cell rates of the various flows are not integer multiples of each other (e.g., the cell rate of flow 2 is 139/138 the rate of flow 1), the simple k method introduces a high amount of latency. For such non-integer related cell rates, the "variable q" method of servicing flows may be used. In the variable q method, the number of cells provided for each flow during the round robin sequencing may change from one cycle to the next.

The total number of cells sent on a flow "i" per frame is M(i) cells, which may include ATM layer cells, filler cells and an ICP cell. The unit "q" is the number of cells sent on a flow during each cycle "n". The term "cycle" is used to refer to a single sequence of servicing the flows in an IMA group. Thus, one or more cycles are used to complete the servicing of the flows for an entire IMA frame. The variable "q" is a function of the particular flow index "i" and the cycle number "n". The constant "C" is used to refer to the number of cycles needed to transmit an entire IMA frame. For a given flow "i", the total number of cells transmitted in an IMA frame is as follows:

$$M(i) = \sum_{n=1}^{C} q(i, n) + 1 \quad (8)$$

where M(i) and q(i,n) are positive integers for i=1, 2, ... N; and n=1, 2, ... C. The "+1" term in Equation (8) accounts for the insertion of one ICP cell per frame.

Figure 9:
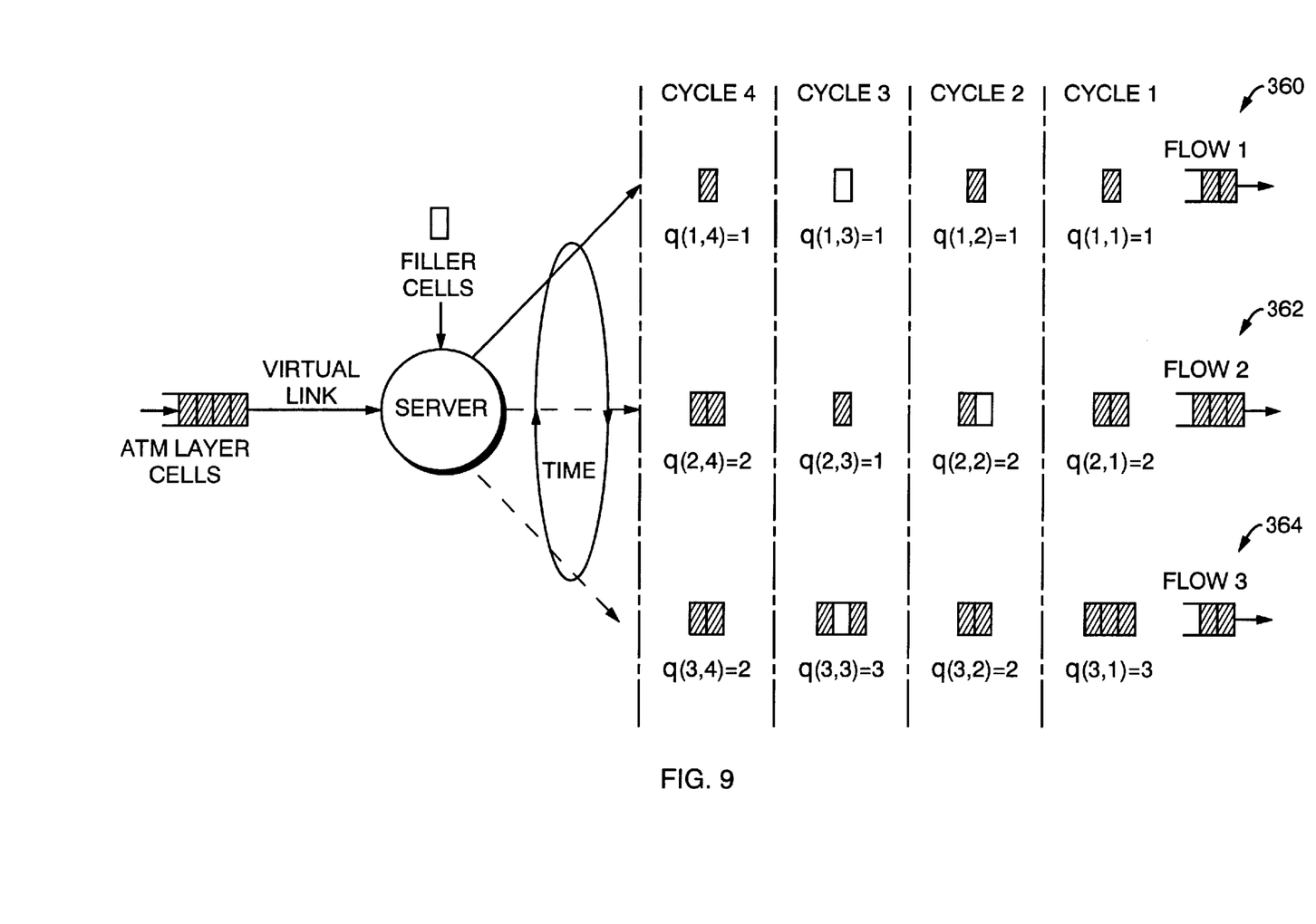
FIG. 9 is a block diagram of flexible ATM inverse multiplexing according to the "variable q" method of the present invention.

The variable q method is illustrated in FIG. 9 for the case of three flows 360, 362, and 364, and four cycles. The q values are such that for flow 1 (360), one cell is sent per cycle. For flow 2 (362), two cells are sent in the first cycle, two cells in the second cycle, one cell in the third cycle, and two cells in the fourth cycle. For flow 3 (364), three cells are sent in the first cycle, two cells in the second cycle, three cells in the third cycle, and two cells in the last cycle. Since an ICP cell must be added once per frame for each flow, the resulting number of cells for the four cycle frame shown in FIG. 9 is five cells for flow 1, eight cells for flow 2, and eleven cells for flow 3. The nominal cell rate relationships between the flows are: flow 2/flow 1=8/5; flow 3/flow 1=11/5. In order to reconstruct the IMA frame at the receiving end, the q values would be communicated from the transmitter to the receiver.

The present invention is applicable to communication systems in general, including wired, wireless, optical, and other forms of communication.

While forms of the invention have been illustrated and described, it will be apparent to those skilled in the art that various modifications and improvements may be made without departing from the spirit and scope of the invention. As such, it is not intended that the invention be limited, except as by the appended claims.

What is claimed is:

1. A method of inverse multiplexing for ATM, comprising:
    receiving a plurality of cells from an ATM layer;
    passing said plurality of cells to an ATM IMA sublayer;
    assigning individual ones of said plurality of cells to a plurality of cell flows to construct IMA frames, at least one cell flow of said plurality of cell flows having a cell delay which is different from a cell delay of at least one other cell flow, wherein a first number of cells in an IMA frame carrying said at least one cell flow of said plurality of cell flows is different from a second number of cells in at least one other IMA frame carrying said at least one other cell flow of said plurality of cell flows; and
    grouping the ones of said plurality of cell flows having the same cell delay into a virtual link.

2. The method of claim 1, wherein said assigning step assigns cells to said plurality of cell flows using at least two different cell rates.

3. The method of claim 2, wherein at least one of said different cell rates is an integer multiple of another of said different cell rates.

4. The method of claim 2, wherein at least one cell rate is not an integer multiple of any of the remaining cell rates.

5. The method of claim 1, wherein said assigning step includes one or more cycles, with each cycle including a single sequence of assigning cells to said cell flows to construct an IMA frame.

6. The method of claim 5, wherein said assigning step assigns a respective fixed number of cells to each cell flow in each cycle.

7. The method of claim 6, wherein one of said respective fixed number of cells is different for at least one cell flow.

8. The method of claim 7, further comprising the step of:
    first assigning cells to the cell flow with the lowest cell rate.

9. The method of claim 7, further comprising the step of:
    first assigning cells to the cell flow with the highest cell rate.

10. The method of claim 5, wherein said assigning step assigns a different number of cells to at least one of said plurality of cell flows in one cycle in comparison with a number of cells assigned to said one of said plurality of cell flows in a different cycle.

11. A method of inverse multiplexing for ATM, comprising:
    receiving a plurality of cells from an ATM layer;
    passing said plurality of cells to an ATM IMA layer;

assigning individual ones of said plurality of cells to a plurality of cell flows to construct IMA frames, at least one cell flow of said plurality of cell flows having a cell rate which is different from a cell rate of at least one other cell flow, wherein a first number of cells in an IMA frame carrying said at least one cell flow of said plurality of cell flows is different from a second number of cells in at least one other IMA frame carrying said at least one other cell flow of said plurality of cell flows.

12. The method of claim 11, wherein said assigning step includes one or more cycles, with each cycle including a single sequence of assigning cells to said cell flows to construct an IMA frame.

13. The method of claim 12, wherein said assigning step assigns a respective fixed number of cells to each cell flow in each cycle.

14. The method of claim 13, wherein one of said respective fixed number of cells is different for at least one cell flow.

15. The method of claim 14, further comprising the step of:
first assigning cells to the cell flow with the lowest cell rate.

16. The method of claim 14, further comprising the step of:
first assigning cells to the cell flow with the highest cell rate.

17. The method of claim 12, wherein said assigning step assigns a different number of cells to at least one of said plurality of cell flows in one cycle in comparison with a number of cells assigned to said one of said plurality of cell flows in a different cycle.

18. The method of claim 11, wherein at least one of said different cell rates is an integer multiple of another of said different cell rates.

19. The method of claim 11, wherein at least one cell rate is not an integer multiple of any of the remaining cell rates.

20. A system for inverse multiplexing for ATM, comprising:
means for receiving a plurality of cells from an ATM layer;
means for passing said plurality of cells to an ATM IMA sublayer;
means for assigning individual ones of said plurality of cells to a plurality of cell flows to construct IMA frames, at least one cell flow of said plurality of cell flows having a cell delay which is different from a cell delay of at least one other cell flow, wherein a first number of cells in an IMA frame carrying said at least one cell flow of said plurality of cell flows is different from a second number of cells in at least one other IMA frame carrying said at least one other cell flow of said plurality of cell flows; and
means for grouping the ones of said plurality of cell flows having the same cell delay into a virtual link.

21. The system of claim 20, wherein said means for assigning assigns cells to said plurality of cell flows using at least two different cell rates.

22. The system of claim 21, wherein at least one of said different cell rates is an integer multiple of another of said different cell rates.

23. The system of claim 21, wherein at least one cell rate is not an integer multiple of any of the remaining cell rates.

24. The system of claim 20, wherein said means for assigning is operable for one or more cycles, with each cycle including a single sequence of assigning cells to said cell flows to construct an IMA frame.

25. The system of claim 24, wherein said means for assigning is operable to assign a respective fixed number of cells to each cell flow in each cycle.

26. The system of claim 25, wherein one of said respective fixed number of cells is different for at least one cell flow.

27. The system of claim 26, wherein the means for assigning is operable to first assign cells to the cell flow with the lowest cell rate.

28. The system of claim 26, wherein the means for assigning is operable to first assign cells to the cell flow with the highest cell rate.

29. The system of claim 24, wherein said means for assigning is operable to assign a different number of cells to at least one of said plurality of cell flows in one cycle in comparison with a number of cells assigned to said one of said plurality of cell flows in a different cycle.

30. A system of inverse multiplexing for ATM, comprising:
means for receiving a plurality of cells from an ATM layer;
means for passing said plurality of cells to an ATM IMA sublayer;
means for assigning individual ones of said plurality of cells to a plurality of cell flows to construct IMA frames, at least one cell flow of said plurality of cell flows having a cell rate which is different from a cell rate of at least one other cell flow, wherein a first number of cells in an IMA frame carrying said at least one cell flow of said plurality of cell flows is different from a second number of cells in at least one other IMA frame carrying said at least one other cell flow of said plurality of cell flows.

31. The system of claim 30, wherein said means for assigning is operable for one or more cycles, with each cycle including a single sequence of assigning cells to said cell flows to construct an IMA frame.

32. The system of claim 31, wherein said means for assigning is operable to assign a respective fixed number of cells to each cell flow in each cycle.

33. The system of claim 32, wherein one of said respective fixed number of cells is different for at least one cell flow.

34. The system of claim 33, wherein said means for assigning is operable to first assign cells to the cell flow with the lowest cell rate.

35. The system of claim 33, wherein said means for assigning is operable to first assign cells to the cell flow with the highest cell rate.

36. The system of claim 31, wherein said means for assigning is operable to assign a different number of cells to at least one of said plurality of cell flow in one cycle in comparison with a number of cells assigned to said one of said plurality of cell flows in a different cycle.

37. The system of claim 30, wherein at least one of said different cell rates is an integer multiple of another of said different cell rates.

38. The system of claim 30, wherein at least one cell rate is not an integer multiple of any of the remaining cell rates.

* * * * *